United States Patent
Sugitani (10) Patent No.: US 9,432,939 B2
(45) Date of Patent: Aug. 30, 2016

(54) WIRELESS COMMUNICATION DEVICE (71) Applicant: PANASONIC INTELLECTUAL PROPERTY MANAGEMENT CO., LTD., Osaka (JP)

(72) Inventor: Toshiyuki Sugitani, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/930,762

(22) Filed: Nov. 3, 2015

(65) Prior Publication Data
US 2016/0150477 A1 May 26, 2016

(30) Foreign Application Priority Data
Nov. 20, 2014 (JP) .................... 2014-235378

(51) Int. Cl.
H04W 52/02 (2009.01)
H04L 1/08 (2006.01)
H04W 52/04 (2009.01)
H04W 56/00 (2009.01)

(52) U.S. Cl.
CPC ............ *H04W 52/0225* (2013.01); *H04L 1/08* (2013.01); *H04W 52/0216* (2013.01); *H04W 52/04* (2013.01); *H04W 56/001* (2013.01)

(58) Field of Classification Search
CPC ........... H04B 7/15507; H04B 7/0837; H04W 52/0216; H04W 52/0261
USPC ............. 455/552.1, 414.1, 412.2, 415, 41.2, 455/500, 514, 550.1, 11.1, 69, 522, 572, 455/573
See application file for complete search history.

(56) References Cited

U.S. PATENT DOCUMENTS 6,374,161 B1 * 4/2002 Iwai ................. H04L 12/40013
701/1
2003/0224729 A1 * 12/2003 Arnold ................. G08C 17/02
455/59

(Continued)

FOREIGN PATENT DOCUMENTS

JP 2008-077529 4/2008
JP 2011-160238 8/2011

(Continued)

OTHER PUBLICATIONS

"Digital Enhanced Cordless Telecommunications (DECT); Ultra Low Energy (ULE); Machine to Machine Communications; Part 1: Home Automation Network (phase 1)", ETSI TS 102 939-1, V1.1.1, Apr. 2013, pp. 1-169.

(Continued)

*Primary Examiner* — John J Lee
(74) *Attorney, Agent, or Firm* — Greenblum & Bernstein, P.L.C.

(57) ABSTRACT

Provided is a wireless communication device for packet communication. When a battery is mounted, transmission and reception of a message for obtaining information necessary for the packet communication are performed and the information is stored in a first communication information storage unit. In a waiting state, main components for wireless communication are powered off. The main components for the wireless communication are powered on at the time of sensor detection. The packet communication is performed using the information in the first communication information storage unit and the sensor detection is notified.

2 Claims, 5 Drawing Sheets

(56) References Cited

U.S. PATENT DOCUMENTS

| | | | |
|---|---|---|---|
| 2004/0039504 A1 | 2/2004 | Coffee et al. | |
| 2012/0221678 A1* | 8/2012 | Tanaka | H04L 1/1835 709/217 |
| 2013/0121223 A1 | 5/2013 | Sugitani | |
| 2014/0064300 A1* | 3/2014 | Negishi | H04L 49/9005 370/429 |
| 2014/0293946 A1 | 10/2014 | Suzuki et al. | |

FOREIGN PATENT DOCUMENTS

| | | |
|---|---|---|
| JP | 2013-098834 | 5/2013 |
| JP | 2013-098883 | 5/2013 |
| JP | 2013-236393 | 11/2013 |

OTHER PUBLICATIONS

"Digital Enhanced Cordless Telecommunications (DECT); Common Interface (CI); Part 2: Physical Layer (PHL)", ETSI EN 300 175-2, V1.9.1, Sep. 2005, pp. 1-64.

"Digital Enhanced Cordless Telecommunications (DECT); Common Interface (CI); Part 3: Medium Access Control (MAC) layer", ETSI EN 300 175-3 , V1.9.1, Sep. 2005, pp. 1-235.

"Digital Enhanced Cordless Telecommunications (DECT); Common Interface (CI); Part 5: Network (NWK) layer", ETSI EN 300 175-5, V1.9.1, Sep. 2005, pp. 1-309.

The Extended European Search Report dated Apr. 18, 2016 for the related European Patent Application No. 15192908.0.

* cited by examiner

WIRELESS COMMUNICATION DEVICE

BACKGROUND OF THE INVENTION

1. Field of the Invention

The present invention relates to a wireless communication device.

2. Description of the Related Art

In recent years, with the remarkable spread of data communication that is performed in a wireless manner, there have been advances in high communication speed, miniaturization of a wireless communication device, low power consumption, and improvement in security technology.

A technology for low power consumption by the wireless communication device that is used in a sensor or the like is disclosed in Japanese Patent Unexamined Publication Nos. 2013-98884 and 2013-236393. Wireless communication devices that are disclosed in Japanese Patent Unexamined Publication Nos. 2013-98884 and 2013-236393 reduce power consumption in a waiting state until a sensor performs detection, by powering off main components for wireless communication, such as a wireless unit, a control unit, and the like. Furthermore, the wireless communication devices store a failure situation at the time of communication in a state storage unit to which power is always supplied, and switch a base-unit detection operation for the wireless communication when the sensor becomes responsive, in a normal state or in a state where a communication failure takes place. Thus, a reduction in power consumption is realized.

Wireless communication in compliance with a Digital Enhanced Cordless Telecommunications (DECT) scheme that has been spread worldwide as a communication scheme for digital cordless telephones is stipulated in ETSI EN 300 175-2: "Digital Enhanced Cordless Telecommunications (DECT); Common Interface (CI); Part 2: Physical Layer (PHL),"ETSI EN 300 175-3: "Digital Enhanced Cordless Telecommunications (DECT); Common Interface (CI); Part 3: Medium Access Control (MAC) layer," and ETSI EN 300 175-5: "Digital Enhanced Cordless Telecommunications (DECT); Common Interface (CI); Part 5: Network (NWK) layer." Also in Japan, the use of wireless devices in compliance with the DECT scheme was approved, and wireless communication devices such as a cordless telephone and an intercommunication system have been of practical use. In recent years, a system in which household electrical appliances within a house are controlled from outside of the house, a household crime prevention system, or the like has gained popularity. Developments in wireless communication for communication between apparatuses on such a home automation network have been made. A method for packet communication suitable for communication between apparatuses on the home automation network, which is based on the wireless communication in compliance with the DECT scheme, is stipulated in "ETSI TS 102 939-1: "Digital Enhanced Cordless Telecommunications (DECT); Ultra Low Energy (ULE); Machine-to-Machine Communications; Part 1; Home Automation Network (Phase 1)" (communication stipulated in ETSI TS 102 939-1: "Digital Enhanced Cordless Telecommunications (DECT); Ultra Low Energy (ULE); Machine-to-Machine Communications; Part 1; Home Automation Network (Phase 1)" is hereinafter referred to as DECT ULE communication).

In such packet communication, data is stored in a packet to which a number is added, transmission of and reception of data are performed on a packet-by-packet basis, re-transmission control is performed using the number that is added to the packet, and the transmission of and the reception of data are performed. In a case of the DECT ULE communication, when the data to be transmitted or received is not present, the wireless communication is interrupted, and when the transmission of the data starts, the packet communication is resumed with a simple sequence. Furthermore, regardless of the interruption of the wireless communication, the packet communication is performed using consecutive packet numbers. Thus, low power consumption and a reduction in data transmission delay are realized. In such packet communication, encryption or authentication of communication data for improving security is performed. In a case of the DECT ULE communication, with encryption communication that uses a counter with cipher block chaining message authentication code (CBC-MAC), security improvement in the packet communication is realized.

SUMMARY OF THE INVENTION

According to an aspect of the present invention, there is provided a wireless communication device that performs data communication using a packet to which a packet number is added from one wireless communication device to the other wireless communication device, the wireless communication device including: a power control unit that outputs power which is supplied from a battery when the battery is connected, and switches between outputting the power that is supplied from the battery and not outputting the power that is supplied from the battery, according to a signal that is input; an output factor display unit on which the fact that the power control unit is in a state of outputting the power that is supplied from the battery is displayed; an event detection unit to which the power is supplied directly from the battery detects an occurrence of an event and outputs a signal in such a manner that the power which is supplied from the battery is output to the power control unit; a wireless communication unit to which the power is supplied through the power control unit; a first storage unit in which communication information necessary for communication is stored; and a control unit to which the power is supplied through the power control unit, that performs control for wireless communication, and that outputs a signal to the power control unit in such a manner that the power that is supplied from the battery is not output, in which, when the control unit to which the power is supplied though the power control unit and starts an operation, the control unit controls the wireless communication unit in such a manner that the communication starts, in which, in a case where information indicating that the power control unit outputs the power by the battery being connected is displayed on the output factor display unit, the control unit performs communication of a control command for determining communication information that is determined in advance, stores the determined communication information in the first storage unit, and performs the data communication using the determined communication information, and in which, in a case where the information indicating that the power control unit outputs the power by the battery being connected is not displayed on the output factor display unit, the control unit performs the data communication using the communication information that is read from the first storage unit.

Accordingly, the wireless communication unit or the control unit that is necessary for the wireless communication when the event occurs is powered on, the wireless communication is activated, and the other party is notified of the occurrence of the event. When the notification of the event is completed, the wireless communication is disconnected and the wireless communication unit or the control unit is powered off. Because of this, power consumption can be reduced while the occurrence of the event is awaited. The control command for determining the communication information that is determined in advance is communicated to the other party only when an operation is performed for the first time after a new battery is connected, and the communication information is stored. When the event occurs and thus the communication is performed, the data communication is performed using the communication information that is stored. Because of this, although the wireless communication unit or the control unit that is necessary for the wireless communication is powered off while the occurrence of the event is awaited, the communication of the control command for determining the communication information is unnecessary when the event occurs and thus the communication is performed. Thus, communication time is shortened and this can reduce power consumption.

In the wireless communication device according to the aspect of the present invention, the control unit may perform the communication of the control command for setting the packet number to an initial value that is determined in advance, may store the packet number in the first storage unit, and, in a case where the packet number is updated through the data communication, updates the packet number that is stored in the first storage unit, in performing the communication of the control command for determining the communication information that is determined in advance in the case where the information indicating that the power control unit outputs the power by the battery being connected is displayed on the output factor display unit.

Accordingly, the control command for initializing the packet number is communicated only when an initial operation is performed for the first time after the new battery is connected, and the communication is performed at the time of the data communication with the packet number added to the packet being updated. When the communication is terminated, the wireless communication unit or the control unit can be powered off. Thus, the power consumption can be reduced.

The wireless communication device according to the aspect of the present invention may further include a second storage unit that is configured as a nonvolatile memory, in which the power is supplied directly from the battery to the first storage unit, and in which the control unit may store one portion of the communication information in the first storage unit, may store the remaining portions in the second storage unit, and, at the time of the data communication, may perform the data communication using the communication information that is read from the first storage unit and the second storage unit.

Accordingly, the packet number does not need to be retained in the nonvolatile memory, and the control is unnecessary that is performed in such a manner that, when the writing to the nonvolatile memory is performed, the limitation on the number of times is not exceeded such as a case where a writing address is changed for every predetermined number of times when the writing to the nonvolatile memory is performed. Thus, the control can be simplified.

In the wireless communication device according to the present invention, the power may be supplied to the second storage unit through the power control unit.

Accordingly, in an event-awaiting state where the data communication is not performed, the power may not be consumed by the second storage unit.

In the wireless communication device according to the aspect of the present invention, which performs encryption of a communication signal using an encryption key that is determined in advance and performs the communication, the control unit may perform communication of a control command for generating the encryption key, may store the encryption key in the first storage unit, may encrypt one portion or all portions of the packet using the encryption key, and may perform the communication, in performing the communication of the control command for determining the communication information that is determined in advance in the case where the information indicating that the power control unit outputs the power by the battery being connected is displayed on the output factor display unit.

Accordingly, the communication of the control command for generating the encryption key only when the initial operation is performed for the first time after the new battery is connected can be performed. When the data communication is activated with the occurrence of the event, the encryption communication that uses the encryption key can be performed without performing the communication of the control command that generates the encryption key. Thus, the data communication is possible with the encryption communication without lengthening the communication time.

In the wireless communication device according to the aspect of the present invention, in a case where the information indicating that the power control unit outputs the power by the battery being connected is displayed on the output factor display unit, the control unit may write one portion of the communication information that is stored in the second storage unit, to the first storage unit, may read the communication information that is stored in the second storage unit, from the first storage unit, at the time of the data communication, and thus may perform the data communication.

Accordingly, the communication information (for example, an identification code of the other communication party, an identification code of the wireless communication device itself or the like) that is communication information which varies from one wireless communication device to another and that is not changed with a normal operation can be stored in the second storage unit, and can be written to the first storage unit from the second storage unit only when the initial operation is performed for the first time after the new battery is connected, and, at the time of the data communication, an operation can be performed referring to the communication information that is stored in the first storage unit. Therefore, an amount of data that is read from the second storage unit can be reduced in a case where for the data communication, the power is supplied to the control unit and the communication is performed. Because of this, the time for which the wireless communication unit or the control unit is powered on can be shortened, and the power consumption can be reduced, in a case where a device such as an EEPROM is used as the second storage unit, reading into which requires a lot of time.

DETAILED DESCRIPTION OF THE PREFERRED EMBODIMENT

In a wireless communication device that is disclosed in Japanese Patent Unexamined Publication Nos. 2013-98884 and 2013-236393, a slot or a frequency that is used in wireless communication is determined in a state of being associated with a synchronization control signal that is transmitted in advance by a control station. Furthermore, in initial data communication, a message of which a delivery acknowledgement is not needed is used, and thus a procedure at the time of communication is simplified and low power consumption during communication is realized. However, realization of low power consumption relating to re-transmission control of an error at the time of data communication is insufficient in a case where events occur at the same time in multiple sensors within a system and a collision of messages at the time of transmission occurs, or in a case where a reception error occurs due to interference from other wireless devices. Because the procedure at the time of communication is simplified, it is difficult to meet a demand for data encryption.

On the other hand, DECT ULE communication is disclosed in ETSI EN 300 175-2: "Digital Enhanced Cordless Telecommunications (DECT); Common Interface (CI); Part 2: Physical Layer (PHL), "ETSI EN 300 175-3: "Digital Enhanced Cordless Telecommunications (DECT); Common Interface (CI); Part 3: Medium Access Control (MAC) layer," ETSI EN 300 175-5: "Digital Enhanced Cordless Telecommunications (DECT); Common Interface (CI); Part 5: Network (NWK) layer," and ETSI TS 102 939-1: "Digital Enhanced Cordless Telecommunications (DECT); Ultra Low Energy (ULE); Machine-to-Machine Communications; Part 1; Home Automation Network (Phase 1)." In such a wireless communication scheme, standards in which an encryption communication method and a packet communication method are stipulated and power saving is considered are proposed. However, like in Japanese Patent Unexamined Publication No. 2013-98884, a technology of efficient low power consumption that results from a combination of a circuit necessary for communication control and of power control is not disclosed.

In a case where wireless communication control is performed using a nonvolatile memory, such as an EEPROM, a design in which a data-writing limitation and the like are considered is necessary, but the design in which such a limitation is considered is not disclosed in Literature described above.

An embodiment of the present invention will be described below.

First Exemplary Embodiment

Configuration of a Cordless Telephone

Figure 1:
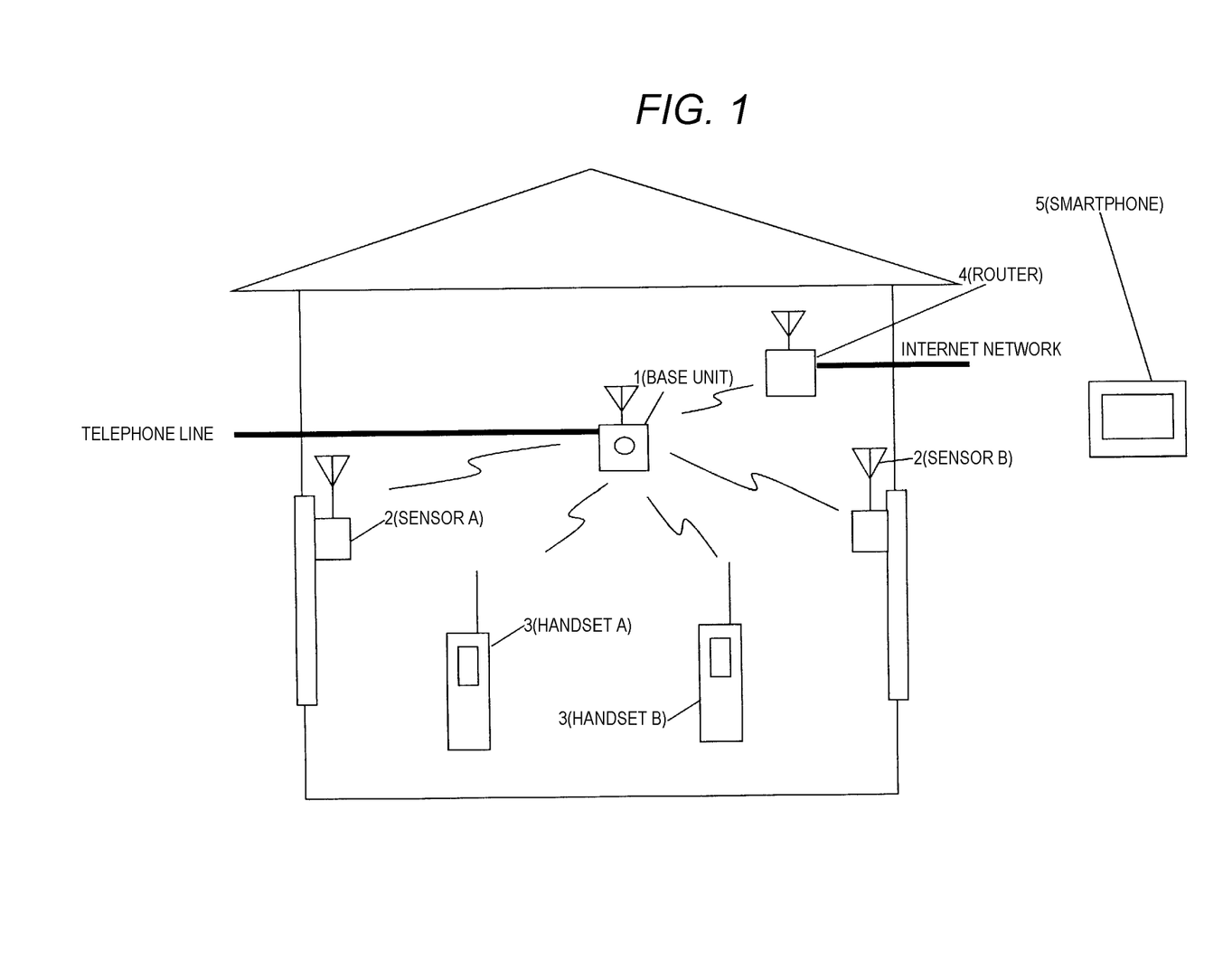
FIG. 1 is a diagram illustrating one example of a home automation network system that uses a wireless communication device according to a first exemplary embodiment.

A configuration example of a wireless communication device according to a first exemplary embodiment is described. FIG. 1 is a diagram illustrating one example of a home automation network system that uses the wireless communication device according to the present embodiment.

The home automation network system that uses the wireless communication device according to the present invention, which is described in FIG. 1, is a system that realizes a telephone function for an outside-line call or for an inside-line call and a crime prevention function of notifying a user inside of or outside of a house that a window is opened or closed. FIG. 1 illustrates a case where the home automation network system is configured from base unit 1, sensor A2, sensor B2, handset A3, handset B3, router 4, and smartphone 5. Sensor A2 and sensor B2 that have the same function, and handset A3 and handset B3 that have the same function are described below as sensor 2 and handset 3, respectively.

In the home automation network system that uses the wireless communication device according to the present invention, which is described in FIG. 1, communication through wireless communication, for example, in compliance with a DECT scheme is possible between base unit 1 and sensor 2 and between base unit 1 and handset 3, and communication through wireless communication, for example, in compliance with a WiFi scheme is possible between base unit 1 and router 4. Base unit 1 is connected to smartphone 5 through router 4 over the Internet.

A user performs an outside-line telephone calling or an inside-line telephone calling with handset 3, by using the home automation network system that uses the wireless communication device according to the present invention, which is illustrated in FIG. 1.

The home automation network system that uses the wireless communication device according to the present invention, which is illustrated in FIG. 1, operates in a normal mode or in a crime prevention mode. The crime prevention mode is a mode in which the user is notified through an alarm and the like that the window is opened, and the normal mode is a mode in which the user is not notified that the window is opened. The user activates the crime prevention mode when he/she leaves the house or goes to bed, and is protected against burglar's break-in. In a case where the home automation network system operates in the crime prevention mode, when sensor 2 notifies base unit 1 that a window is opened, base unit 1 notifies handset 3 that the window is opened, base unit 1 and handset 3 raise the alarm, and thus a person in each room is notified that the window is opened. Base unit 1 makes a call to a designated telephone number through a telephone line, and, when the other party answers the call, transmits an audio message notifying that the window is opened. Base unit 1 transmits an electronic mail that notifies a registered address that the window is opened, through router 4 over the Internet, and notifies the user of a smartphone that the window is opened.

Configuration of Base Unit 1

Figure 2:
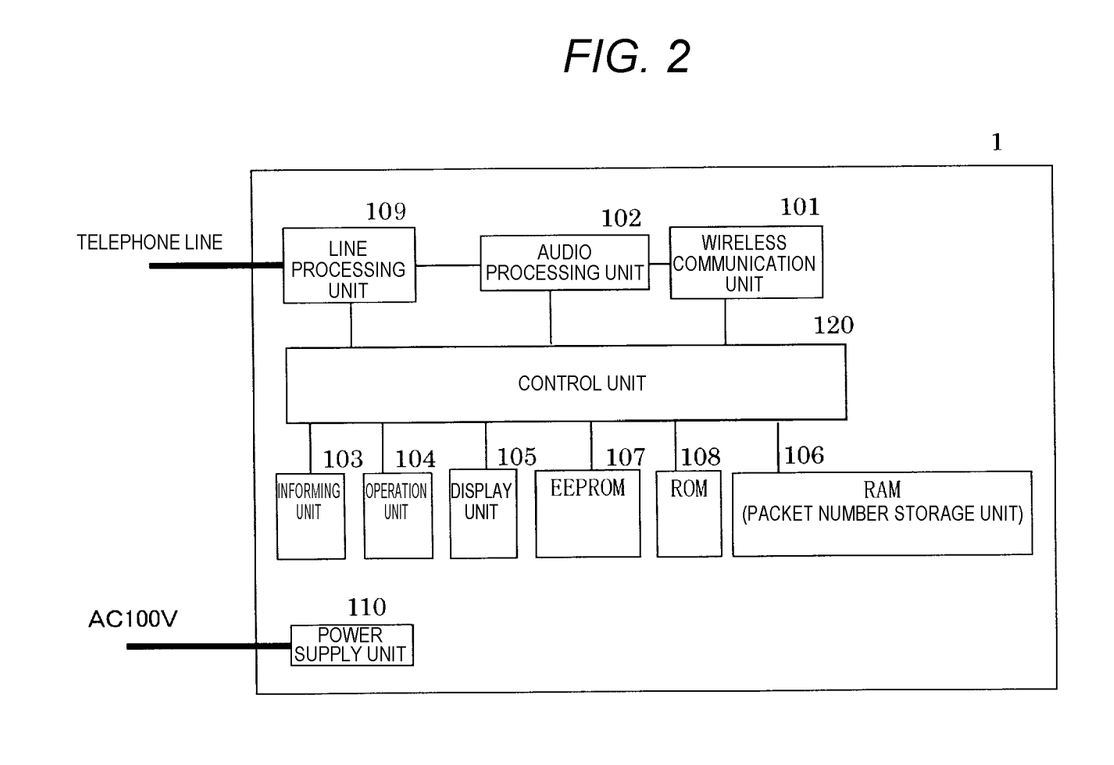
FIG. 2 is a block diagram illustrating one example of a configuration of a base unit according to the first exemplary embodiment.

A configuration example of base unit 1 is described. FIG. 2 is a block diagram illustrating a configuration example of base unit 1.

In FIG. 2, base unit 1 has wireless communication unit 101, audio processing unit 102, informing unit 103, operation unit 104, display unit 105, RAM (packet number storage unit) 106, EEPROM 107, ROM 108, power supply unit 110, and control unit 120.

Wireless communication unit 101 transmits and receives control data or a packet for wireless link establishment or a data telephone call to and from sensor 2, handset 3, and router 4 in a predetermined scheme that depends on a device of each of sensor 2, handset 3, and router 4. In the present specification, "wireless communication" is defined as including wireless transmission and wireless reception.

Audio processing unit 102 converts an audio signal that is input from the telephone line, into a digital signal, generates audio data for transmission to handset 3, converts audio data that is received from handset 3, or data for audio guidance that notifies that a window is opened, into an analog signal, and outputs the resulting analog signal to the telephone line.

In the case where the home automation network system operates in the crime prevention mode, when sensor 2 notifies base unit 1 that the window is opened, informing unit 103 outputs an informing sound.

Operation unit 104 is a button to which a user operation is applied. The user operations, for example, include an operation of stopping the informing sound, an operation of switching between the crime prevention mode and the normal mode, and the like.

Information is displayed, for the user, on display unit 105. The information, for example, is information indicating whether a current operation state is the crime prevention mode or the normal mode.

Among pieces of information necessary for executing a program for controlling base unit 1, RAM (packet number storage unit) 106 is used for storing data that does not need to be retained at the time of power-off. In a case where the entire RAM (packet number storage unit) 106, also including a storage unit for managing the packet number that is transmitted from the sensor, is referred to, this is described below as RAM 106. In a case where only a storage unit for managing the packet number of RAM (packet number storage unit) 106 is referred to, this is described below as packet number storage unit 106.

Among the pieces of information necessary for executing the program for controlling base unit 1, EEPROM 107 is used for storing data that needs to be retained even at the time of power-off. For example, an identification number for identifying base unit 1 itself or the other party, a telephone number of or a mail address of the other party in a case where the user outside of a house is notified that the window is opened, and the like, which are necessary for performing wireless communication with sensor 2 and handset 3, are stored.

ROM 108 is a memory into which the program for controlling base unit 1 is embedded.

Power supply unit 110 produces a direct current that is necessary for each unit of base unit 1 to operate, from 100 V commercial electric power, and supplies the direct current to each block of base unit 1 (connection to each unit is not illustrated).

Control unit 120 is configured as a central processing unit (CPU), and controls operation of the entire base unit 1 in cooperation with each unit described above. Operation of control unit 120 will be described in detail below.

Functional units that are included in base unit 1 are not limited to 101 to 120 that are illustrated in FIG. 2, and may include other functional units. The other functional units may be ones that realize main functions of base unit 1, and may be ones that realize auxiliary functions that assist the main functions.

Configuration of Sensor 2

Figure 3:
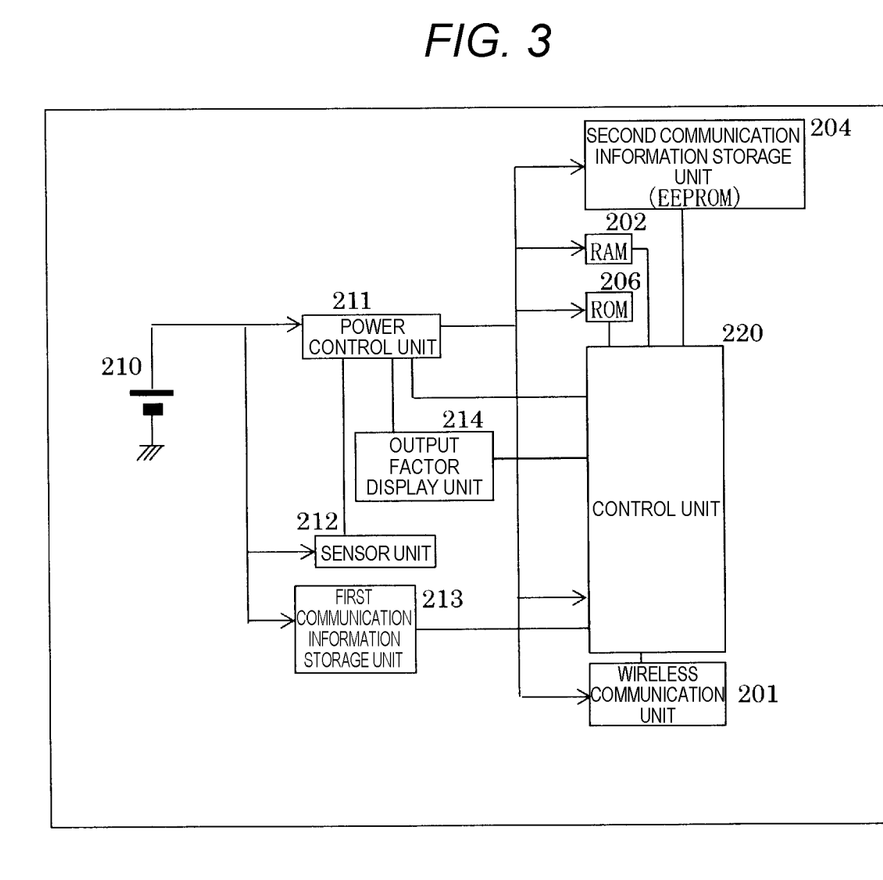
FIG. 3 is a block diagram illustrating one example of a configuration of a sensor according to the first exemplary embodiment.

A configuration example of sensor 2 is described. FIG. 3 is a block diagram illustrating a configuration example of sensor 2.

In FIG. 3, sensor 2 has wireless communication unit 201, RAM 202, second communication information storage unit 204, ROM 206, battery 210, power control unit 211, sensor unit 212, first communication information storage unit 213, output factor display unit 214, and control unit 220.

Wireless communication unit 201 transmits and receives the control data or the packet for the wireless link establishment or the data telephone call to and from base unit 1 in a predetermined scheme.

Among pieces of information necessary for executing a program for controlling sensor 2, RAM 202 is used for storing data that does not need to be retained when the power control unit interrupts power supply.

Second communication information storage unit 204 is a nonvolatile memory, such as an EEPROM, and, among the pieces of information necessary for executing the program for controlling sensor 2, is used for storing data that needs to be retained even at the time of power-off. For example, the identification number for identifying sensor 2 itself or the other party, which is necessary for performing the wireless communication with base unit 1, an authentication code that is necessary when generating an encryption key, and the like are stored.

ROM 206 is a memory into which a program for controlling sensor 2 is embedded.

Battery 210 is a battery that supplies power necessary for operation of sensor 2. For example, a lithium battery with a rated output of 3 V and the like are used. Power is supplied from battery 210 directly to sensor unit 212 and first communication information storage unit 213, and is supplied from battery 210 through power control unit 211 to wireless communication unit 201, RAM 202, second communication information storage unit 204, ROM 206, and control unit 220.

Power control unit 211 supplies the power that is supplied from battery 210, to wireless communication unit 201, RAM 202, second communication information storage unit 204, ROM 206, and control unit 220 according to a signal from sensor unit 212, and cuts off power that is supplied to wireless communication unit 201, RAM 202, second communication information storage unit 204, ROM 206, and control unit 220 according to a signal from control unit 220. In a case where battery 210 is newly mounted and power starts to be supplied from battery 210, the power is supplied from battery 210 to wireless communication unit 201, RAM 202, second communication information storage unit 204, ROM 206, and control unit 220.

Sensor unit 212 detects that the window is opened, and outputs a signal (described as a power-on signal) that is to be supplied to wireless communication unit 201, RAM 202, second communication information storage unit 204, ROM 206, and control unit 220, to power control unit 211.

Among the pieces of information necessary for executing the program for controlling sensor 2, first communication information storage unit 213 is used for storing data that needs to be retained even at the time of power-off and that needs to be rewritten for every communication. As examples of this data, the packet number and the like are stored. First communication information storage unit 213 is used for storing communication information that differs from one wireless communication device to another and that is not changed in a normal operation. For example, as examples of this data, there are the identification number for identifying sensor 2 itself or the other party, which is necessary for performing the wireless communication with base unit 1, the encryption key, and the like. When battery 210 is newly mounted and sensor 2 operates for the first time, the identification number for identifying sensor 2 itself or the other party is read by second communication information storage unit 204, and the encryption key is obtained by communication of a control command for determining information on communication with base unit 1 when battery 210 is newly mounted.

Information indicating whether power is supplied to wireless communication unit 201, RAM 202, second communication information storage unit 204, ROM 206, and control unit 220 by battery 210 being newly mounted or is supplied to wireless communication unit 201, RAM 202, second communication information storage unit 204, ROM 206, and control unit 220 according to a signal from sensor unit 212, that is, a factor that causes power control unit 211 to supply the power, is displayed on output factor display unit 214.

Control unit 220 is configured as a central processing unit (CPU) and controls operation of the entire sensor 2 in cooperation with each unit described above. When sensor unit 212 detects that the window is opened, control unit 220 activates wireless communication, notifies base unit 1 that the window is opened, and outputs to power control unit 211 a signal (described as a power-off signal) for interrupting the wireless communication and cutting off power supply to wireless communication unit 201, RAM 202, second communication information storage unit 204, ROM 206, and control unit 220. In a case where the information indicating that the power is supplied by battery 210 being newly mounted is displayed on output factor display unit 214, control unit 220 performs wireless communication for performing generation of the encryption key and initialization of the packet number. The operation of control unit 220 will be described in detail below.

Functional units that are included in sensor 2 are not limited to 201 to 220 that are illustrated in FIG. 3, and may include other functional units. The other functional units may be ones that realize main functions of sensor 2, and may be ones that realize auxiliary functions that assist the main functions.

Operation of Each of Base Unit 1 and Sensor 2

An operational example of the home automation network system that uses the wireless communication device according to the present invention, which is described above, is described.

Figure 4:
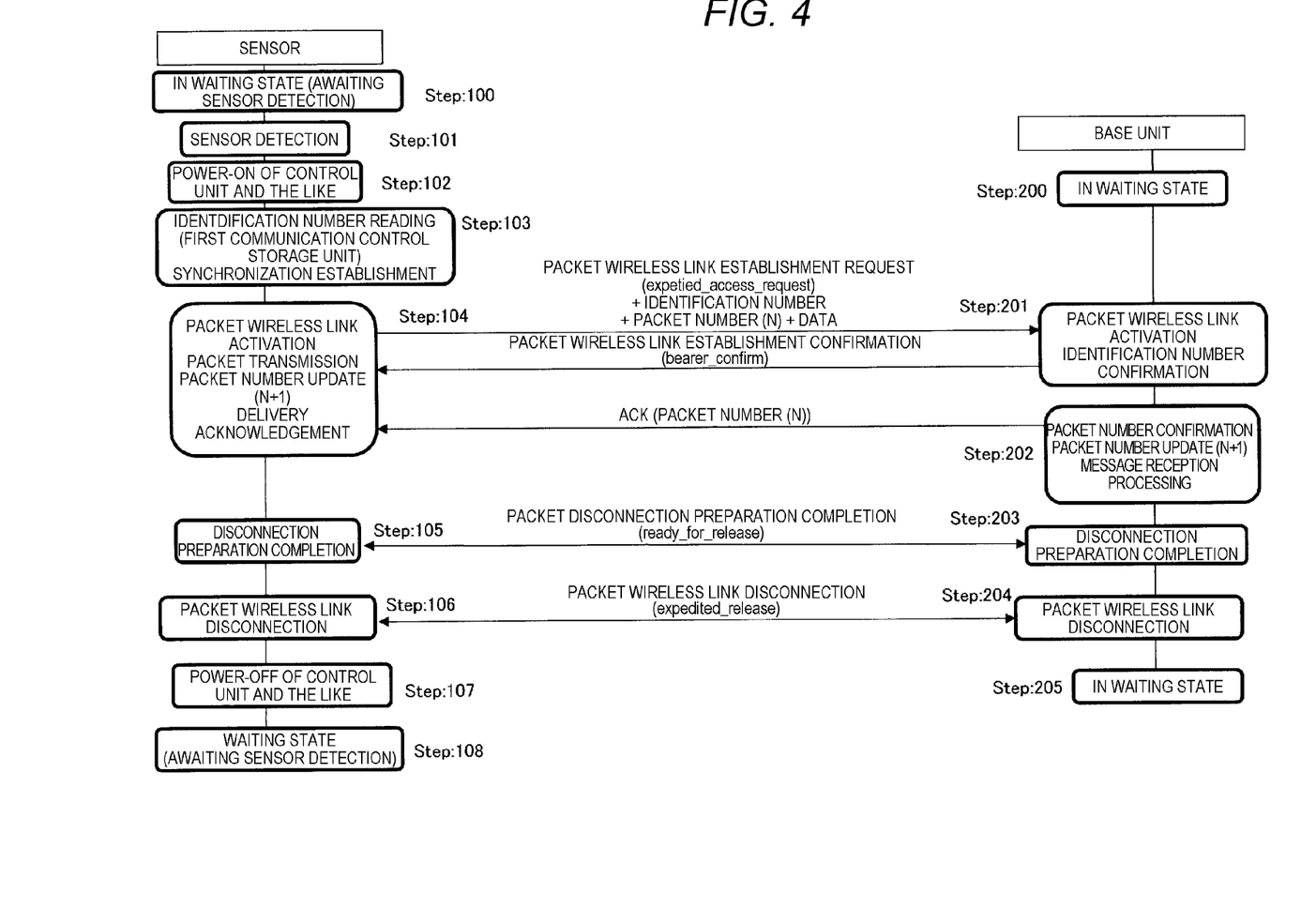
FIG. 4 is a diagram illustrating one example of a signal that is transmitted and received through wireless communication between the base unit and the sensor according to the first exemplary embodiment and of operation of each of the base unit and the sensor.

FIG. 4 is a diagram illustrating one example of a signal that is transmitted and received through wireless communication between base unit 1 and sensor 2 when it is detected that the window is opened, and of operation of each of base unit 1 and sensor 2.

In a waiting state, in sensor 2, power is supplied only to sensor unit 212 and first communication information storage unit 213, and sensor unit 212 operates in such a manner as to detect that the window is opened (Step: 100).

On the other hand, in the waiting state, in base unit 1, control unit 120 operates in such a manner that wireless communication unit 101 is controlled to receive a signal from the sensor while transmitting a signal (hereinafter referred to as a control signal) for enabling the sensor to recognize the base unit and to retain synchronization (Step: 200).

When it is detected in sensor unit 212 of sensor 2 that the window is opened, sensor unit 212 outputs the power-on signal to power control unit 211 (Step: 101), power is supplied to control unit 220 and the like through power control unit 211 (Step: 102), and control to perform the wireless communication with the base unit is started. At this time, the information indicating that the power is supplied according to the signal from sensor 212 is displayed on output factor display unit 214.

Control unit 220 that starts an operation by the power being supplied reads an identification number of the base unit and its own identification number from first communication information storage unit 213, establishes synchronization to the base unit using the identification number of the base unit, notifies its own identification number, and controls wireless communication unit 201 in such a manner that the wireless communication is activated (Step: 103). For example, in the case where base unit 1 and sensor 2 perform the communication through the wireless communication in compliance with the DECT scheme, base unit 1 transmits a control signal for enabling a frame and a slot in TDMA to retain synchronization, and sensor 2 establishes the synchronization of the frame and the slot in TDMA to base unit 1 by receiving the control signal and performs wireless communication in compliance with a TDMA scheme. At this time, base unit 1 transmits the identification number that is stored in EEPROM 107, in a state of being included in the control signal, and by receiving a notification, sensor 2 specifies base unit 1 of the home automation network system to which sensor 2 itself belongs.

In the case where the information indicating that the power is supplied according to the signal from sensor unit 212 is displayed on output factor display unit 214, when the synchronization to base unit 1 is completed, control unit 220 of sensor 2 reads an encryption key from first communication information storage unit 213, encrypts a message notifying base unit 1 of a packet wireless link establishment request and that the window is opened, using the encryption key, and transmits a packet that results from packetizing encrypted data, to base unit 1, and performs control in such a manner that the delivery acknowledgement is performed (Step: 104). At this time, control unit 220 reads the packet number for the delivery acknowledgement that is attached to the packet, from first communication information storage unit 213 and performs control in such a manner that the packet number which is stored in first communication information storage unit 213 in preparation for the next-time packet transmission is updated. Control unit 220 reads the identification number which is stored in second communication information storage unit 204 and performs control in such a manner that the identification number which is read as one portion of the wireless establishment request message is transmitted.

On the other hand, when receiving a packet wireless establishment request from sensor 2, control unit 120 of base unit 1 checks an identification number of sensor 2, which is sent, by comparing the identification number of sensor 2 against an identification number of every sensor that is stored in EEPROM 107, and determines from which sensor a signal is sent. In a case where the packet wireless establishment request comes from the handset that is registered, control unit 120 transmits a packet wireless establishment confirmation to sensor 2 and establishes a wireless link for packet communication (Step: 201).

Control unit 120 reads a corresponding packet number of the sensor, among the packet numbers that are stored in packet number storage unit 106, compares the packet number that is sent, against the packet number that is read, and determines whether or not the two packet numbers are the same. In a case where the packet number that is sent and the packet number of the sensor, which is stored in packet number storage unit 106, are the same, control is performed in such a manner that processing that receives a message that is sent in the packet format, that is, a message notifying that the window is opened, for example, processing that activates the alarm in informing unit 103 or notifies handset 3 and smartphone 5 that the window is opened, is performed, that the packet number corresponding to sensor 2, which is stored in packet number storage unit 106 in preparation for the next-time packet reception, is updated, and that the delivery acknowledgement (ACK) notifying sensor 2 that the packet is received is sent (Step: 202).

When the transmission and reception of the delivery acknowledgement (ACK) is completed and packet communication interruption preparation is completed, both sensor 2 and base unit 1 send a packet disconnection preparation completion message notifying that the packet communication interruption preparation is completed (Step: 105) (Step: 203).

When packet disconnection preparation completion is received and the other party recognizes that packet communication interruption preparation is completed, sensor 2 and base unit 1 transmit a packet wireless link disconnection message notifying that the packet wireless link is disconnected, and interrupt transmission and reception operations for the packet communication (Step: 106) (Step: 204).

When the transmission and reception operations for the packet communication are interrupted, control unit 220 of sensor 2 outputs the power-off signal to power control unit 211 and cuts off the power supply to wireless communication unit 201, RAM 202, second communication information storage unit 204, ROM 206, and control unit 220 (Step: 107), and proceeds to the waiting state in which it is detected that the window is opened (Step: 108).

In the same manner, when the transmission and reception operations for the packet communication are interrupted, base unit 1 also proceeds to the waiting state in which base unit 1 waits for communication with the sensor (Step: 205).

In the case where base unit 1 and sensor 2 perform the communication through the wireless communication in compliance with the DECT scheme, the packet wireless link establishment request is a message called expedited_access_request that is a message for controlling a MAC layer, a packet wireless link establishment confirmation is a message called bearer_confirm that is the message for controlling the MAC layer, the packet disconnection preparation completion is a message called ready_for_release that is the message for controlling the MAC layer, and the packet wireless link disconnection is a message called expedited_release. Packetization of data is performed in compliance with a FU10a format that is stipulated with a DLC layer, and a message (ACK) for the delivery acknowledgement is established in a FU10d format that is stipulated with the DLC layer.

Next, an operational example in a case where a battery of sensor 2 that is in operation is re-connected, in the home automation network system that uses the wireless communication device according to the present invention, which is described above, is described.

Figure 5:
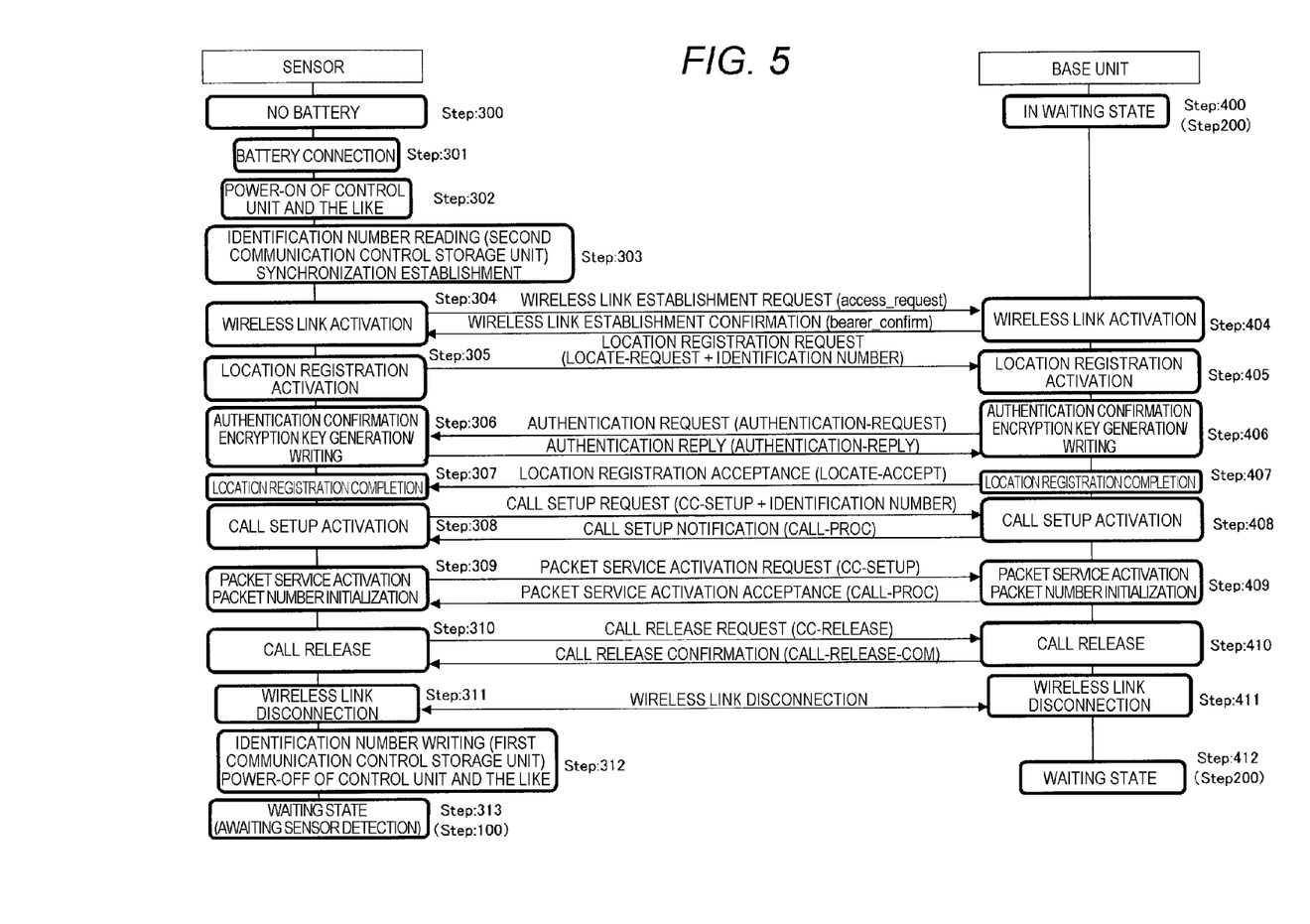
FIG. 5 is a diagram illustrating one example of a signal that is transmitted and received through the wireless communication between the base unit and the sensor according to the first exemplary embodiment after a sensor battery is connected, and of operation of each of the base unit and the sensor.

FIG. 5 is a diagram illustrating one example of a signal that is transmitted and received through the wireless communication between the base unit and the sensor after a sensor battery is connected, and of operation of each of the base unit and the sensor.

As described above referring to Step: 200 in FIG. 4, in the waiting state, in base unit 1, control unit 120 operates in such a manner that wireless communication unit 101 is controlled to receive a signal from sensor 2 while transmitting a control signal for enabling sensor 2 to recognize the base unit and to retain synchronization (Step: 400).

On the other hand, in sensor 2, when in a battery-demounted state (Step: 300), battery 210 is connected (Step: 301), power is supplied to control unit 220 and the like through power control unit 211 (Step: 302), and control to perform the wireless communication with base unit 1 starts. At this time, the information indicating that power control unit 211 outputs power by battery 210 being connected is displayed on output factor display unit 214.

In the case where the information indicating that the power is supplied by the battery being connected is displayed on output factor display unit 214, control unit 220 that starts an operation by the power being supplied reads the identification number of the base unit and the identification number of control unit 220 itself from second communication information storage unit 204, establishes the synchronization to the base unit using the identification number of the base unit, notifies the identification number of control unit 220 itself, and controls wireless communication unit 201 in such a manner that the wireless communication is activated (Step: 303). For example, in the case where base unit 1 and sensor 2 perform the communication through the wireless communication in compliance with the DECT scheme, base unit 1 transmits a control signal for enabling a frame and a slot in TDMA to retain synchronization, and sensor 2 establishes the synchronization of the frame and the slot in TDMA to base unit 1 by receiving the control signal and performs wireless communication in compliance with a TDMA scheme. At this time, base unit 1 transmits the identification number that is stored in EEPROM 107, in a state of being included in the control signal, and, by receiving a notification, sensor 2 specifies base unit 1 of the home automation network system to which sensor 2 itself belongs.

In the case where the information indicating that the power is supplied by the battery being connected is displayed on output factor display unit 214, when the synchronization to base unit 1 is completed, control unit 220 of sensor 2 controls wireless communication unit 201 in such a manner that a wireless link establishment request is transmitted to base unit 1 (Step: 304). Furthermore, when base unit 1 receives a wireless link establishment request, control unit 120 of base unit 1 controls wireless communication unit 101 in such a manner that the wireless link establishment request is transmitted to the sensor (Step: 404), and a wireless link for performing location registration and communication of the call control message between base unit 1 and sensor 2 is activated.

When the wireless link for performing the location registration and the communication of the call control message is activated, sensor 2 reads an identification number that is stored in second communication information storage unit 204 and transmits the identification number that is read as one portion of a location registration request message (Step: 305). Furthermore, base unit 1 checks the identification number for every sensor, which is stored in EEPROM 107, by comparison and determines from which sensor 2 a signal is sent (Step: 405).

Subsequently, in a case where the location registration request comes from a registered handset, base unit 1 transmits an authentication request message (Step: 406), and sensor 2 that receives an authentication request transmits an authentication reply message (Step: 306). At this time, base unit 1 generates suitable random numbers and notifies sensor 2 of the generated random numbers with the authentication request message. Sensor 2 generates a numerical value for authentication reply and an encryption code, with a computing operation that is determined in advance, using the random numbers that are sent and an authentication code that is stored in second communication information storage unit 204, transmits the numerical value for the authentication reply to the base unit with the authentication reply message, and stores the encryption key in second communication information storage unit 204. Base unit 1, like sensor 2, obtains the numerical value for the authentication reply and the encryption key, using the random numbers that are transmitted at the authentication request and the authentication code for every sensor, which is stored in EEPROM 107. When the numerical value for the obtained authentication reply is consistent with the numerical value for the authentication reply that is sent from sensor 2, base unit 1 rewrites an encryption key that corresponds to every sensor, which is stored in EEPROM 107, as the newly generated encryption key.

When authentication confirmation and encryption key generation are correctly terminated, base unit 1 transmits a location registration acceptance message to the sensor (Step: 407). When receiving the location registration acceptance message, the sensor stores the encryption key that is generated in Step: 306, in second communication information storage unit 204.

Subsequently, sensor 2 reads the identification number that is stored in second communication information storage unit 204, and transmits the identification number that is read as one portion of a call setup request message (Step: 308). Furthermore, base unit 1 checks the identification number for every sensor, which is stored in EEPROM 107, by comparison and determines from which sensor a signal is sent. If the signal is a call setup request from the handset that is registered, base unit 1 transmits a call setup notification and notifies sensor 2 that a call setup is completed and communication of the call control message is possible (Step: 408).

When the communication of the call control message is possible, sensor 2 transmits a packet service activation request for activating the packet communication (Step: 309). When receiving the packet service activation request, base unit 1 transmits packet service activation acceptance (Step: 409).

When packet service activation is completed, control unit 220 of sensor 2 rewrites the packet number that is stored in first communication information storage unit 213, as an initial value (for example, 0) that is determined in advance. Then, control unit 120 of base unit 1, like sensor 2, rewrites the packet number that is stored in packet number storage unit 106, as an initial value (for example, 0) that is determined in advance.

Additionally, when the packet service activation is completed, sensor 2 transmits a call release request for releasing a call setup (Step: 310). When receiving the call release request, base unit 1 transmits a call release confirmation (Step: 410).

A wireless link disconnection completion message is transmitted from both sides, and transmission and reception operations for performing the communication of the call control message are interrupted (Step: 311) (Step: 411). Control unit 220 of sensor 2 writes the identification number of the base unit and the identification number of control unit 220 itself to first communication information storage unit 213, and outputs the power-off signal to power control unit 211, cuts off power supply to wireless communication unit 201, RAM 202, second communication information storage unit 204, ROM 206, and control unit 220 (Step: 312), and proceeds to the waiting state (a state in Step: 100, which is described referring to FIG. 4) in which it is detected that the window is opened (Step: 313).

In the same manner, when the transmission and reception operations for communication of the location registration and the call control message are interrupted, base unit 1 also proceeds to the waiting state in which base unit 1 waits for communication with sensor 2 (Step: 412). A state in Step: 412 is the same as the state in Step: 200, which is described above referring to FIG. 4.

In the case where base unit 1 and sensor 2 perform the communication through the wireless communication in compliance with the DECT scheme, the wireless link establishment request is a message called access_request that is the message for controlling the MAC layer, the wireless link establishment confirmation is a message called bearer$_{13}$ confirm that is the message for controlling the MAC layer, the location registration request is a message called LOCATE_REQUEST that is a message for controlling an NWK layer, the authentication request is a message called AUTHENTICATION_REQUEST that is the message for the NWK layer, the authentication reply is a message called AUTHENTICATION_REPLY that is the message for controlling the NWK layer, the position registration acceptance is a message called LOCATE_ACCEPT that is the message for controlling the NWK layer, the call setup request is a message called CC-SETUP that is the message for controlling the NWK layer, the call setup notification is a message called NWKCC-CALL-PROC that is the message for controlling the NWK layer, the call release request is a message called NWKCC-RELEASE that is the message for controlling the NWK layer, the call release confirmation is a message called CC-RELEASE-COM that is the message for controlling the NWK layer, and the wireless link disconnection is a message called release. In the case where the communication is performed through the wireless communication in compliance with the DECT scheme, a procedure for activation of the DLC layer for transmission and reception of an NWK layer message is needed after establishment of the wireless link, but an example of this is omitted.

The operation is described above referring to FIGS. 4 and 5. That is, the case is described in which in Step: 313 in FIG. 5, the identification number of the base unit and the identification number of control unit 220 are written to first communication information storage unit 213 and in which in Step: 100 in FIG. 4, the identification number of the base unit and the identification number of control unit 220 are read from first communication information storage unit 213. However, the operation may be performed in such a manner that, in Step: 100 in FIG. 4, the identification number of the base unit and the identification number of control unit 220 are read from second communication information storage unit 204 without the operation being performed in such a manner that, in Step: 313 in FIG. 5, the identification number of the base unit and the identification number of control unit 220 are written to first communication information storage unit 213.

The operation is described above referring to FIGS. 4 and 5. That is, the operation in a case where the encryption key is stored in first communication information storage unit 213. However, the operation may be performed in such a manner that the encryption key is stored in second communication information storage unit 204 and is read from second communication information storage unit 204.

As an example, the operation is described above as being performed in such a manner that control unit 220 reads pieces of information that are stored in first communication information storage unit 213 and second communication information storage unit 204. However, when the operation starts, control unit 120 stores the pieces of information that are read from first communication information storage unit 213 and second communication information storage unit 204, in RAM 202, reads the pieces of information written to RAM 202, and performs the communication with base unit 1. Furthermore, when a power-off signal is output at the time of the communication termination, in a case where the pieces of information in RAM 202 are updated, the operation may be performed in such a manner that the pieces of information in first communication information storage unit 213 and second communication information storage unit 204 are updated.

The embodiment of the present invention is described above. As described above, because the wireless communication device according to the present invention activates the transmission and reception and transmits a packet only when data transmission is necessary, this is effective in low power consumption by the wireless communication device.

Because the wireless communication device according to the present invention supplies power to a control unit and a wireless communication unit and enables the control unit and the wireless communication unit to operate only when data transmission is necessary, this is effective in low power consumption by the wireless communication device.

Because, the number of times that a necessary control message is exchanged for activating the packet communication to transmit the packet is decreased. Thus, the communication time can be shortened and this is effective in low power consumption at the time of communication and is successful in shortening a response time.

Because there is no need to use a nonvolatile memory as a means of storing the packet number, such as an EEPROM, a capacity of the nonvolatile memory that is used in the wireless communication device can be decreased. This leads to an effect of cost reduction. Furthermore, because control in which it is considered that there is a limitation to writing to the nonvolatile memory does not need to be performed, this leads to an effect of making it easy to build a system.

Even in a case where parameters necessary for the packet communication such as the packet number are lost such as when a battery is replaced in the wireless communication device, the packet communication can be resumed with a simple procedure, and a user does not need to perform a special operation when replacing the battery. This achieves an effect of improving convenience.

The wireless communication device according to the present invention is useful as a wireless communication device for building a home network.

What is claimed is:

1. A wireless communication device that transmits a data packet including a packet number to the other communication party, the wireless communication device comprising:
   a battery;
   a first storage to which power is supplied from the battery and in which the packet number is stored;
   a second storage that is configured as a nonvolatile memory and in which an identification number is stored;
   an event detector to which the power is supplied from the battery and that detects an occurrence of an event;
   a controller;
   a wireless communication interface that performs transmission and reception of the data packet between the wireless communication device and the other communication party, under control of the controller; and
   a connection controller that supplies power of the battery to the second storage, the controller, and the wireless communication interface, in a case where the battery is newly mounted, or in a case where the event detector detects the occurrence of the event, and that cuts off the supply of the power to the second storage, the controller, and the wireless communication interface according to an instruction of the controller,
   wherein, in a case where the event detector detects the occurrence of the event, the controller generates the data packet including a wireless link establishment request, a message notifying the occurrence of the event, and the packet number that is stored in the first storage, transmits the generated data packet from the wireless communication interface to the other communication party, updates the packet number that is stored in the first storage when a delivery acknowledgement is received from the other communication party, and gives an instruction to disconnect the supply of the power to the connection controller, and
   wherein, in a case where the battery is newly mounted, the controller establishes synchronization between the wireless communication device and the other communication party, using identification information that is stored in the second storage, rewrites the packet number that is stored in the first storage, as an initial value that is determined in advance, and gives the instruction to disconnect the supply of the power to the connection controller.

2. The wireless communication device of claim 1, wherein the event detector is a sensor that detects a window being opened, as the occurrence of the event.

* * * * *